July 23, 1957 J. C. McFADYEN 2,800,264
CARRIER ATTACHMENT FOR AUTOMOBILE
Filed Feb. 12, 1954 3 Sheets-Sheet 1

INVENTOR.
JOHN C. McFADYEN
BY
Boykin, Mohler & Buckley
ATTORNEYS

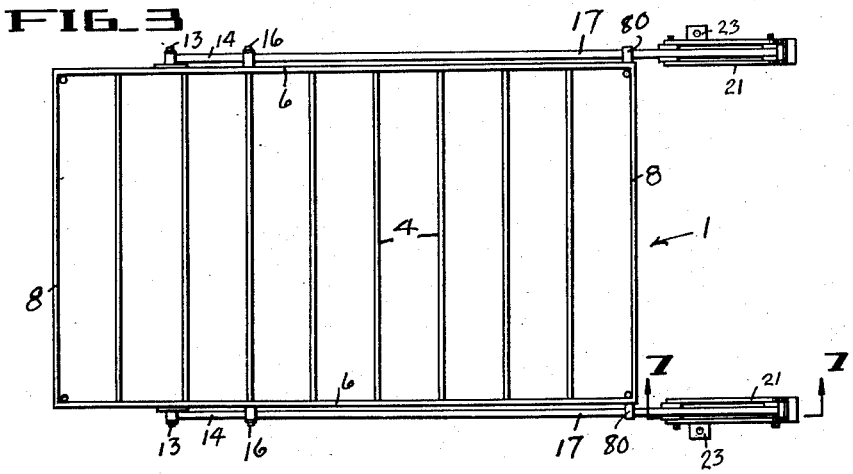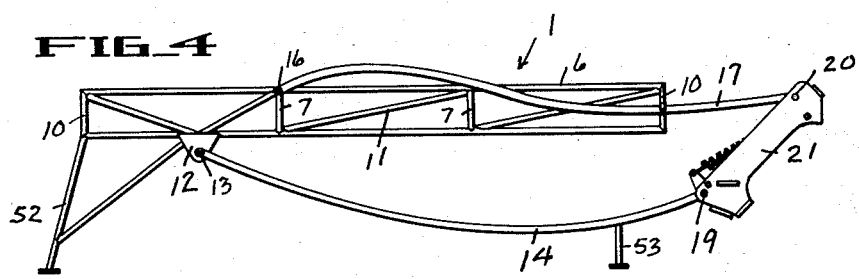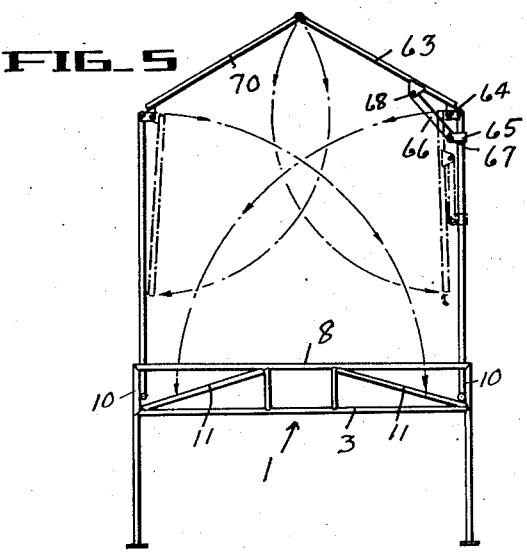

July 23, 1957  J. C. McFADYEN  2,800,264
CARRIER ATTACHMENT FOR AUTOMOBILE
Filed Feb. 12, 1954  3 Sheets-Sheet 3
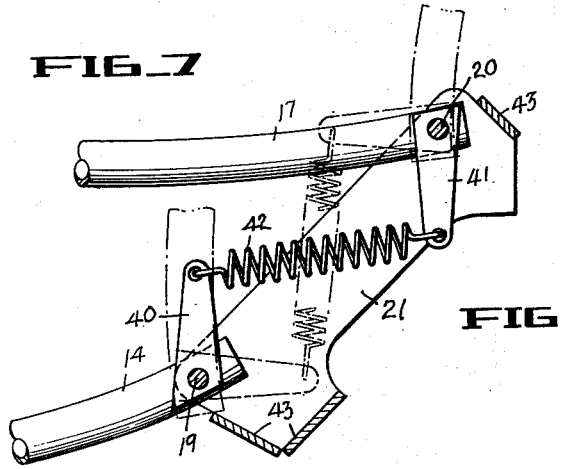
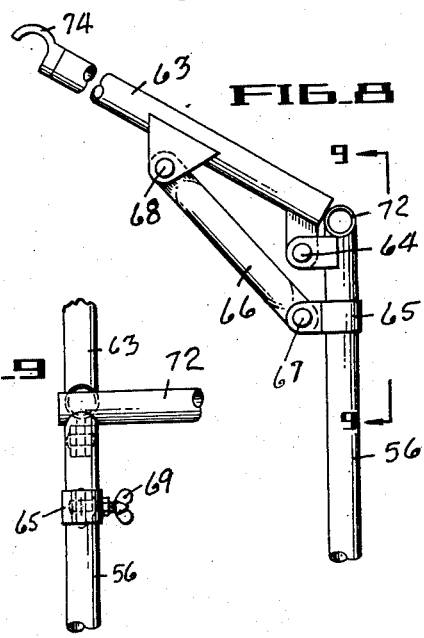
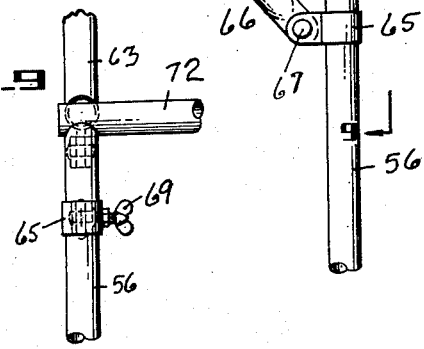
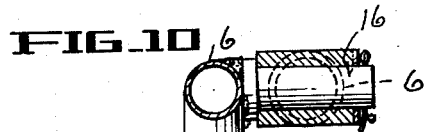
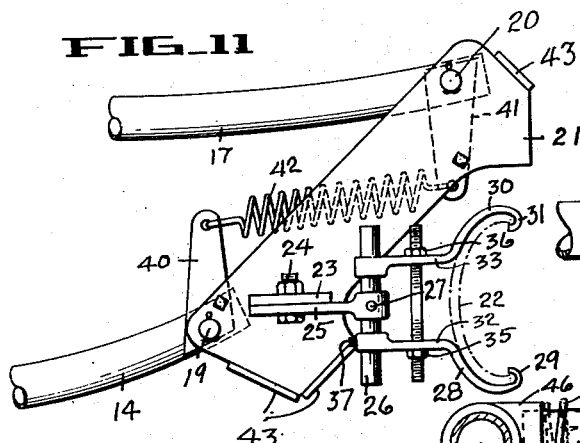
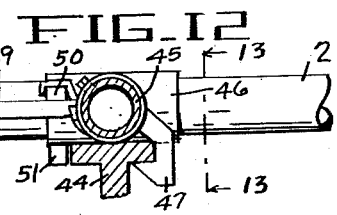
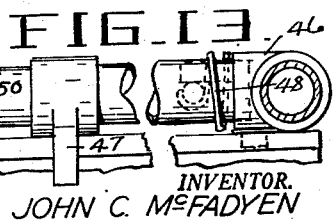
INVENTOR.
JOHN C. McFADYEN
BY
Boyken, Mohler & Beckley,
ATTORNEYS United States Patent Office 2,800,264
Patented July 23, 1957

2,800,264

CARRIER ATTACHMENT FOR AUTOMOBILE

John C. McFadyen, Berkeley, Calif.

Application February 12, 1954, Serial No. 409,885

6 Claims. (Cl. 224—42.08)

This invention relates to a carrier attachment for an automobile and has for one of its objects the provision of a load carrier, such as for holding luggage, camping equipment, etc., that is adapted to be swung from an elevated position over the body of an automobile to a lowered position extending rearwardly of said automobile and vice versa, and which carrier will remain substantially horizontal at all times so as not to cause the load thereon to shift or to fall therefrom.

Heretofore carriers have been provided for supporting objects, such as small boats, for swinging from a position above an automobile, to a position rearwardly thereof, but in most instances of which I am aware, no provision is made for keeping the rack or boat horizontal, with the result that anything loose in the carrier will tend to shift or to fall therefrom.

Another object of the invention is the provision of a load carrier for an automobile which carrier is provided with means adapted to secure said carrier to the rear bumper of any automobile for swinging said carrier from a position extending rearwardly of the automobile to a position extending over the body of such automobile, and vice versa.

The present invention, in many instances, is adapted to be used in place of a trailer, and in one form of the present invention the carrier is provided with compact means for supporting a tent, with the carrier itself supporting a mattress as well as being adapted to support other articles when the carrier is packed for travel, and in this form, means is provided for supporting the carrier spaced above the ground independently of the automobile, if desired, or one end may be supported from the automobile bumper without detaching it.

By enabling the carrier to take the place of a trailer, the many objections to the trailer are eliminated, and when the present carrier is positioned on the automobile, ready for travel, and with the load thereon, it does not interfere with vision through the rear window of the automobile, nor through the other windows, thus enabling safe traveling for the occupants of the automobile as well as for other travelers on the highway.

Other objects and advantages will appear in the description and drawings.

In the drawings,

Fig. 3 is a top plan view of the carrier in the position seen in Fig. 2 but without the tent frame of Fig. 2.

Fig. 4 is a side elevational view of the carrier of Fig. 3.

Fig. 5 is a rear end view of the carrier of Fig. 2 with directional lines indicating the manner in which the tent frame may be folded into the load carrying rack.

Fig. 6 is an enlarged perspective view of the connection between one pair of the corner tent posts of Fig. 2 (near posts) and the rack.

Fig. 7 is an enlarged sectional view taken along line 7—7 of Fig. 3.

Fig. 8 is an enlarged, fragmentary elevational view of one of the corner tent posts and the gable forming piece.

Fig. 9 is a view of a portion of Fig. 8 as seen from line 9—9 of Fig. 8.

Fig. 10 is an enlarged fragmentary view showing a pivotal connection between the rack and one of the arms that connects the rack with a bracket on the automobile.

Fig. 11 is an enlarged fragmentary elevational view of the bracket that is adapted to connect the rack arms with the rear bumper of the automobile.

Fig. 12 is a part sectional and part elevational view of one type of structure that may be used, if desired, to releasably hold the rack in the position shown in Fig. 1.

Fig. 13 is a sectional view taken along line 13—13 of Fig. 12.

Figure 1:
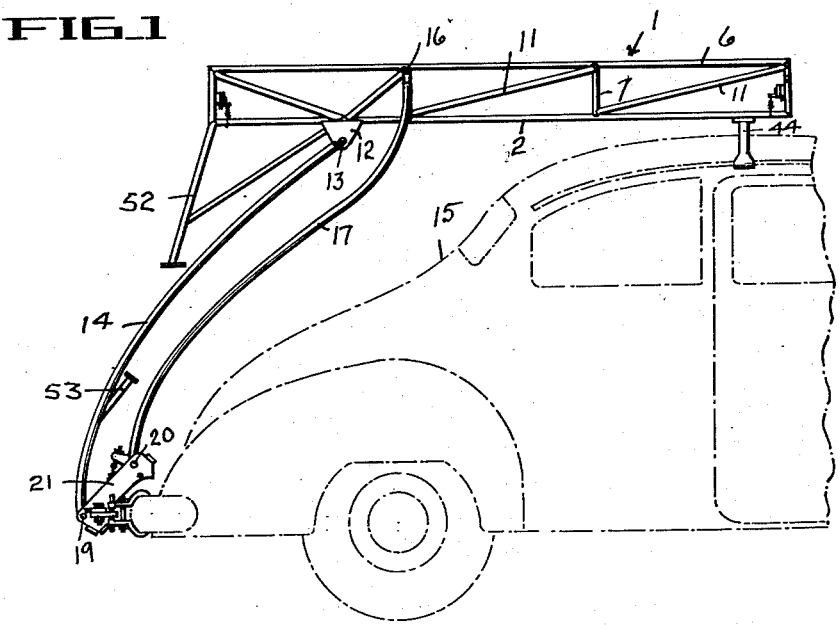
Fig. 1 is a side elevational view of the carrier as it would appear on an automobile in position over the latter, which automobile is indicated in dot-dash lines.

In detail, the load carrying rack illustrated in the drawings is generally indicated at 1, and may be formed in various ways since the particular structure disclosed is merely one of several suitable forms. As shown, the rack is oblong in outline, and is formed by horizontal side frame members 2 (Figs. 1, 2), and end frame members 3. Cross frame members 4 extend between the side frame members 2 and are parallel with the end frame members 3. If desired, a bottom (not shown) may be supported on the cross members 4, and such bottom may have sides and ends (not shown). No specific claim is made to the precise structure of the load carrying rack, since its exact structure may depend upon the character of what it is intended to hold. The present structure is suitable for camping equipment, such as tent, bedding, and the like, and for this purpose, sides in the form of tubing or strips 6 may be supported by short posts 7 above the frame members 2, and end strips or tubing 8 may be similarly positioned above the end frame members 3 by short posts 9. Corner posts 10 may be at the junctures between the side and end frame members and extend to the junctures between the side and end elements 6, 8. Any suitable bracing 11 may be used to strengthen the side and end construction and preferably all of the structure above described is of tubing.

Hereinafter, the use of the words "forward" and "rear" or "forwardly" and "rearwardly" or words of similar meaning, are intended to refer to directions relative to the forward and rear ends of an automobile. Thus the rear end of the rack 1 is intended to refer to the end that is remote from the forward end of the automobile, to which the carrier is adapted to be secured, and the forward end of the rack is the end nearest the forward end of the automobile.

The side frame members 2 of the rack may each have a bracket 12 (Fig. 1) secured thereto adjacent to, but spaced forwardly of the rear end of the rack. This bracket has a horizontal pivot 13 that pivotally secures the upper end of an arm 14 thereto, when the rack is on top of the rear end portion of an automobile that is indicated at 15 by dot-dash lines in Fig. 1.

Spaced forwardly of pivot 13, as seen in Fig. 1, and at about the level of the side elements 6 of the rack, is a pivot 16 (Fig. 10) which connects the upper end of a second arm 17 with the rack. A similar pivot is at the other side of the rack. Thus, there is a pair of arms 14, 17 at each side of the rack 1.

Arms 14, 17 extend downwardly and rearwardly and the arms of each pair are respectively pivoted at their lower ends at 19, 20 (Fig. 11) to a bumper bracket 21, there being two such brackets, one for the arms of each pair.

The pivots 19, 20 are horizontally and vertically offset to the same degree as pivots 13, 16, hence the arms 14, 17 function the same as parallel arms, and they are generally parallel except that they are curved to somewhat conform to the contour of the rear end of the automobile 15, and to enable the arms to clear each other at the pivots when the rack is in the position shown in Fig. 1 also by the curvature of the arms, greater stability of the rack, during swinging, is accomplished.

The structure at the bumper brackets 21 is important, since these brackets are adapted to be secured to conventional rear bumpers on most, if not all, stock model automobiles.

Conventional rear bumpers are of the general structure indicated in dot-dash lines at 22, in Fig. 11. They may have different cross sectional contours and be of different widths (vertically) but usually they are formed from a strip of sheet steel and have upper and lower edges.

The brackets 21 are the same, so the following description applies to either one. Each such bracket is preferably of sheet metal of sufficient strength and gauge to support the arms 14, 17 and rack 1 including whatever load is on the rack, during swinging of the rack from the elevated position shown in Fig. 1 to the lowered position shown in Figs. 2, 4. Each bracket 21 is elongated and disposed in a plane substantially at right angles to the length of bumper 22 with the forward end of the bracket elevated above and extending over the bumper 22 (Fig. 11).

Secured to a side of each bracket is a projection 23 (Fig. 11) rigid therewith, and a vertical bolt 24 connects this projection with an arm 25 that extends horizontally therefrom.

Arm 25 is formed with a vertical bore at its outer end that is remote from the bolt 24, and a vertical bar 26 is secured in said bore by a set screw 27, or by any other suitable means. The upper and lower ends of bar 26 project above and below the outer end of arm 27.

A lower clamping jaw 28 is curved to generally conform to the cross sectional contour of bumper 22 and is formed at its outer end with a hook 29 that is adapted to hook over the lower edge of the bumper, while an upper clamping bar 30 has a hooked outer end 31 corresponding with the lower hooked end 29, but oppositely directed since the end 31 is adapted to hook over the upper edge of bumper 22.

Opposed horizontally extending extensions 32, 33 respectively on jaws 28, 30 are formed with coaxial bores at their outer ends that are remote from the clamping jaws for snugly receiving the lower and upper ends of bar 26 below and above the outer end of arm 25.

A bolt 34 extends at its ends through extensions 32, 33 at points between the jaws 28, 30 and the bar 26 and nuts 35, 36 respectively on the lower and upper ends of bolt 34 function to hold the clamping jaws in firm engagement with the bumper 22. A set screw 37 rigidly secures the extension 32 to bar 26 at the desired level of the lower jaw 28.

From the foregoing description it is seen that the clamping jaws 28, 30 are adapted to be adjusted up and down relative to the bar 26, and the latter is also vertically and rotatably adjustable in arm 25, while arm 25 is adjustable about the vertical axis of bolt 24. Also the jaws are adjustable about the axes of bar 26, and the jaws 28, 30 are held in clamping relation to the bumper by the bolt 34.

In the preferred form, the lower ends of the arms 14, 17 are provided with rigid angularly extending projections 40, 41 respectively. These projections extend substantially at right angles to the arms and when the arms are horizontally extending, as seen in Fig. 7, they project toward each other. A spring 42 connects the outer ends of extensions 40, 41.

While brackets 21 have each been described as being a plate, in reality, each bracket is formed of a pair of spaced opposed plates of the same contour connected by webs 43 (Fig. 7). Thus the projections 40, 41 and spring 42 are disposed between the plates for a considerable part of their travel and the two plates of each bracket provide adequate strength to resist distortion.

In actual practice, the pivots 13, 16 are at the sides of the rear end portion of the rack. As seen in Fig. 1 pivot 16, which is the farthest forward, is at a point about a third the distance between the front and rear ends of the rack.

A conventional ski bar or support 44 extending across the top of the automobile functions as a support for the forward end portion of the rack 1 when the latter is in traveling position with the forwardly and upwardly inclined arms 14, 17 supporting the rear end portion of the rack.

When the rack is in traveling position as seen in Fig. 1, it is seen that in order to swing the rack to a position extending rearwardly of the automobile, the entire load must move upwardly, hence it is not always necessary to lock the rack to the bar 44, but where such locking may be desired and necessary, a structure such as shown in Figs. 12, 13 may be employed in which cross bar 45 is rotatable at its ends in fittings 46 that are part of the side member 2, and this cross bar is over the ski support 44 when the rack 1 is in the position shown in Fig. 1. Cross bar 45 carries a latch 47 (Fig. 12) that is adapted to engage the support 44 when the rack 1 is on the latter. Torsion springs 48 (Fig. 13) function to yieldably rotate bar 45 so as to maintain the latch in locking position, but upon swinging one or the other of handles 49 (Fig. 12) adjacent the ends of bar 45 downwardly, the latch 47 is released and the rack 1 can be swung upwardly. Stop 50 functions as a stop to prevent the latch from swinging too far clockwise (as seen in Fig. 12) to prevent its automatic locking action when the rack is swung to the position seen in Fig. 1. Also, stops 51 (Fig. 12) on fittings 46 prevents any tendency of the rack to slide forwardly on the bar 44.

Figure 2:
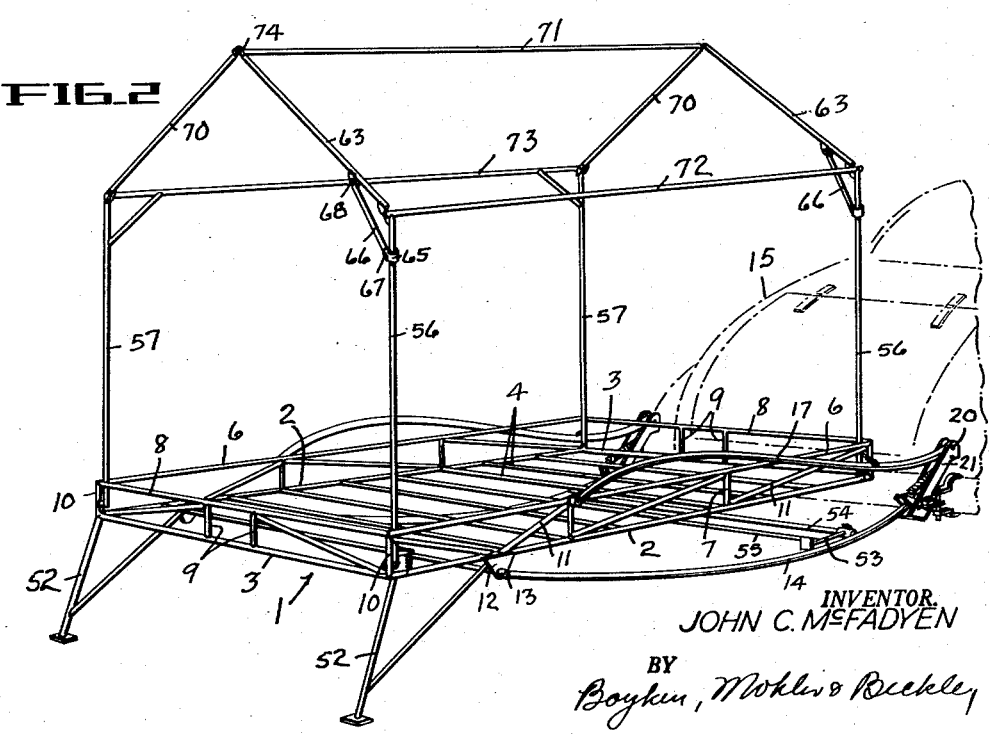
Fig. 2 is a perspective view of the carrier in horizontal position extending from the rear of the automobile, with a tent frame on the carrier in a position for a tent.

As best seen in Fig. 4 when the rack 1 is swung to the position shown in Fig. 2 extending rearwardly from the automobile, rigid rear legs 52 at the rear end of the rack support said rear end on the ground, and legs 53 (Figs. 2, 4), swingably supported on a cross bar 54 (Fig. 2) that extends between arms 14 may be swung down to support the forward end of the rack on the ground making it possible to detach the rack from this automobile bumper and use the rack as a mattress or tent support or table independently of the automobile.

The legs 52 do not project rearwardly beyond the lower ends of arms 14, 17 when the rack is on the top of the automobile, and the legs 53 may have sufficient resistance to turning on bar 54 to stay collapsed as seen in Fig. 2 although preferably a second bracing cross bar 55 may support the legs in collapsed position as seen in Fig. 2 when the legs 53 are not being used.

As already mentioned, the present invention is suitable for a tent support and as a substitute for a trailer where a tent, mattress, etc. are to be carried.

Tent posts 56 are at the ends of one side of the rack and tent posts 57 are at the ends of the other side (Fig. 2).

Each post 56 is supported at its lower end on a horizontal pivot 58 (Fig. 6) that is secured to each short corner post 10 at the ends of one side of rack 1 (Fig. 6). A bearing 59 rigid with the lower end of each tent post is on each pivot 58. A crank arm 60 projecting from a side of each bearing 59 is connected at its outer end by a tension spring 61 with side members 2 adjacent thereto. This spring tends to hold each of the posts 56, 57 upright when the said posts are swung to upright position, and a spring clip 62 on each element 6 that is above the member 2, also functions to hold the posts upright.

Said posts each has a gable member 63 (Fig. 8) at its upper end, which gable members are each horizontally pivoted at 64 to the upper end of each post. Pivots 64 are preferably below the upper ends of each post and to one side of the latter so that said gable members will be stopped by the post when they are swung upwardly to the desired angle as seen in Fig. 8.

A collar 65 slidable on each post 56 is connected by a brace 66 with each gable member 63, and pivots 67, 68 pivotally connect the ends of each brace with each collar and gable member.

A locking screw 69 (Fig. 9) extending through each collar 65 is adapted to lock the collar to the post when the gable member is swung upwardly to the desired position, thus the gable members can be swung to their correct position for forming half of the gable of a tent and locked in such positions by one man, and the posts 56 can be held vertically by springs 61.

The other posts 57 have plain horizontal pivots at their lower ends such as at 58 without the spring 61 and crank 60 and at their upper ends they pivotally carry the gable members 70 on plain pivots such as 64, but the braces 66 and collar 65 are omitted.

The outer ends of gable members 70 are connected by a ridge piece 71 (Fig. 2) and eave pieces 72, 73 respectively connect the upper ends of posts 56 and the upper ends of posts 57.

Ridge piece 71 extends across the outer ends of the gable members 70 and is adapted to be received in socket elements 74 (Fig. 8) carried by the outer ends of gable members 63 thus the gable pieces will be releasably held in the position shown in Fig. 2 for a conventional tent covering (not shown), and the tighter the tent is pulled downwardly, the tighter the gable members will be held.

To pack the tent, all that is necessary is to remove the tent covering and fold the gable pieces and posts to collapsed positions at the ends of and within the rack, as best indicated in Fig. 5.

This tent structure as described above enables one man to set up the tent. The rack may hold the mattress, and the tent and mattress are adapted to be supported above the ground. The structure can be quickly disconnected from the automobile, and as quickly re-connected.

The extensions 40, 41 and springs 42 are so arranged that the springs 42 will tend to assist in lifting the rack 1 off the automobile, and off the ground, and this tendency also helps to ease the rack onto the automobile as well as to ease it to the lowered position.

The rack itself will be carried throughout its entire movement in a horizontal position. Thus any load thereon will not be shifted or spilled from the rack when the latter is swung to and from either its lowered position or its elevated position.

Stop members 80 may also be secured to the forward posts 10 for engaging over the arms 17 when the rack is in the lowered position (Fig. 3).

I claim:

1. A carrier attachment for an automobile comprising; a substantially horizontally disposed load supporting rack, a pair of arms at each of two opposite sides of said rack with the arms of the pair at one side of said rack corresponding in structure and position to the arms of the pair at the other side of said rack, pivots pivotally securing one of the ends of each pair of said arms to said rack at each of said two opposite sides of the latter, clamping means at the other ends of the arms of each pair for securing said other ends to the bumper of such automobile and pivots connecting said other ends to said clamping means, the pivots at the opposite ends of one of the arms of each pair being correspondingly offset vertically and horizontally relative to the pivots at the opposite ends of the other arm of each pair when said rack is horizontal for holding said rack horizontal during swinging of said arms from an elevated position supporting said rack over an automobile to a lowered position with said rack rearwardly of such automobile and about level with said bumper when said clamping means is secured to said bumper.

2. A carrier attachment for an automobile comprising; a substantially horizontally disposed load supporting rack, a pair of arms at each of two opposite sides of said rack with the arms of the pair at one side of said rack corresponding in structure and position to the arms of the pair at the other side of said rack, pivots pivotally securing one of the ends of each pair of said arms to said rack at each of said two opposite sides of the latter, clamping means at the other ends of the arms of each pair for securing said other ends to the bumper of such automobile and pivots connecting said other ends to said clamping means, the pivots at the opposite ends of one of the arms of each pair being correspondingly offset vertically and horizontally relative to the pivots at the opposite ends of the other arm of each pair when said rack is horizontal for holding said rack horizontal during swinging of said arms from an elevated position supporting said rack over an automobile to a lowered position with said rack rearwardly of such automobile and about level with said bumper when said clamping means is secured to said bumper, the arms of each pair being substantially correspondingly curved to generally conform to the contour of the rear end of the body of an automobile.

3. A carrier attachment for an automobile comprising; a substantially horizontally disposed load supporting rack, a pair of arms at each of two opposite sides of said rack with the arms of the pair at one side of said rack corresponding in structure and position to the arms of the pair at the other side of said rack, pivots pivotally securing one of the ends of each pair of said arms to said rack at each of said two opposite sides of the latter, clamping means at the other ends of the arms of each pair for securing said other ends to the bumper of such automobile and pivots connecting said other ends to said clamping means, the pivots at the opposite ends of one of the arms of each pair being correspondingly offset vertically and horizontally relative to the pivots at the opposite ends of the other arm of each pair when said rack is horizontal for holding said rack horizontal during swinging of said arms from an elevated position supporting said rack over an automobile to a lowered position with said rack rearwardly of such automobile and about level with said bumper when said clamping means is secured to said bumper, said pivots pivotally securing one of the ends of each pair of arms to said rack being at the end portion of said rack adjacent to the rear end of said automobile when said rack is over said automobile and the major portion of the rack extending forwardly over the part of the automobile that is forwardly of said rear end, and means adapted to be secured to the body of such automobile for supporting said major portion of said rack.

4. A carrier attachment for an automobile comprising; a substantially horizontally disposed load supporting rack, a pair of arms at each of two opposite sides of said rack, with the arms of the pair at one side of said rack corresponding in structure and position to the arms of the pair at the other side of said rack, pivots pivotally securing one of the ends of each pair of said arms to said rack at each of said two opposite sides of the latter, clamping means at the other ends of the arms of each pair for securing said other ends to the bumper of such automobile and pivots connecting said other ends to said clamping means, the pivots at the opposite ends of one of the arms of each pair being correspondingly offset vertically and horizontally relative to the pivots at the opposite ends of the other arm of each pair when said rack is horizontal for holding said rack horizontal during swinging of said arms from an elevated position supporting said rack over an automobile to a lowered position with said rack rearwardly of such automobile and about level with said bumper when said clamping means is secured to said bumper, means on one arm of each pair for supporting one end of said rack and said one arm of each pair and said bracket spaced above the ground when said rack is in said lowered position, and legs on said rack for supporting the other end of said rack including the ends of said arms pivoted to said rack spaced above the ground whereby said rack and said arms including said bracket will be supported spaced above the ground independently of said automobile upon releasing said clamping means from the bumper of the automobile.

5. A carrier attachment for an automobile comprising; a pair of clamps each having a pair of jaws supported for movement into gripping relation with the rear bumper of an automobile, means for so moving said jaws, a bracket carried by each pair of said jaws, an upper horizontal pivot and a lower horizontal pivot respectively directly carried by each bracket, said upper pivots being in coaxial alignment and said lower pivots being in coaxial alignment with said upper pivots offset laterally relative to said lower pivots in direction toward the automobile when said jaws are on said bumper, a horizontal load supporting rack adapted to be positioned horizontally above the body of such automobile, a pair of arms pivotally connected at one of their ends to the upper and lower pivots on each of said brackets and extending upwardly therefrom to said rack, and means pivotally securing the upper ends of the arms of each pair to said rack at points positioned on said rack corresponding in spacing and relative positions to the positions of the upper and lower pivots on each bracket when said rack is horizontal.

6. A carrier attachment for an automobile comprising; a pair of clamps each having a pair of jaws supported for movement into gripping relation with the rear bumper of an automobile, means for so moving said jaws, a bracket carried by each pair of said jaws, an upper horizontal pivot and a lower horizontal pivot carried by each bracket, said upper pivots being in coaxial alignment and said lower pivots being in coaxial alignment with said upper pivots offset laterally relative to said lower pivots in direction toward the automobile when said jaws are on said bumper, a horizontal load supporting rack adapted to be positioned horizontally above the body of such automobile, a pair of arms pivotally connected at one of their ends to the upper and lower pivots on each of said brackets and extending upwardly therefrom to said rack, and means pivotally securing the upper ends of the arms of each pair to said rack at points positioned on said rack corresponding in spacing and relative positions to the positions of the upper and lower pivots on each bracket, the pair of arms pivotally secured to each bracket having an extension thereon rigid therewith and projecting horizontally generally toward each other from each pivot to substantially opposed relationship and a helical spring connecting the outer ends of the extensions on each such pair of arms under tension whereby upon swinging said arms from upwardly extending position rearwardly relative to such automobile to generally horizontally extending position the said extensions will progressively move toward each other for a predetermined distance and then away from each other with progressively increasing tension on said springs as they move away from each other.

References Cited in the file of this patent

UNITED STATES PATENTS

| | | |
|---|---|---|
| 1,370,227 | Schilke | Mar. 1, 1921 |
| 2,492,841 | Burkey | Dec. 27, 1949 |
| 2,521,815 | Will | Sept. 12, 1950 |
| 2,573,187 | Desilets | Oct. 30, 1951 |
| 2,584,163 | Squires | Feb. 5, 1952 |